United States Patent
Takamatsu et al.

(10) Patent No.: US 7,289,287 B2
(45) Date of Patent: Oct. 30, 2007

(54) APPARATUS FOR RECORDING OR/AND REPRODUCING INFORMATION AND METHOD FOR REDUCING POWER CONSUMPTION THEREOF

(75) Inventors: Kouhei Takamatsu, Kawasaki (JP); Tomoaki Saito, Kawasaki (JP); Kenji Itou, Kawasaki (JP); Isamu Tomita, Kawasaki (JP); Hiroshi Tsurumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/277,647

(22) Filed: Oct. 22, 2002

(65) Prior Publication Data

US 2003/0133216 A1 Jul. 17, 2003

(30) Foreign Application Priority Data

Jan. 17, 2002 (JP) ............................. 2002-008577

(51) Int. Cl.
*G11B 19/02* (2006.01)
*G11B 15/46* (2006.01)
*G11B 15/18* (2006.01)

(52) U.S. Cl. .................. 360/69; 360/71; 360/73.03; 360/75

(58) Field of Classification Search ................. 360/27, 360/69, 70, 71, 74.1, 75, 77.02, 77.04–77.06, 360/78.04–78.08, 73.03; 369/47–58
See application file for complete search history.

(56) References Cited

U.S. PATENT DOCUMENTS 5,544,138 A * 8/1996 Bajorek et al. .......... 369/53.42
5,854,720 A * 12/1998 Shrinkle et al. ............... 360/69
6,118,743 A * 9/2000 Kumita ..................... 369/47.44
6,381,204 B1 * 4/2002 Kobayashi et al. ........ 369/47.3

FOREIGN PATENT DOCUMENTS

| GB | 2 266 403 A | 10/1993 |
|---|---|---|
| JP | 05-041020 | 2/1993 |
| JP | 05-298841 | 11/1993 |
| JP | 06-139682 | 5/1994 |
| JP | 06-333339 | 12/1994 |
| JP | 11-317001 | 11/1999 |
| JP | 2000-67765 | 3/2000 |
| JP | 2000-195143 | 7/2000 |
| JP | 2000-298917 | 10/2000 |
| JP | 2002288951 A * | 10/2002 |

OTHER PUBLICATIONS

JP 05-041020; Electronic Translation.*
JP 06-139682; Electronic Translation.*

* cited by examiner

*Primary Examiner*—William R. Korzuch
*Assistant Examiner*—Jason Olson
(74) *Attorney, Agent, or Firm*—Greer, Burns & Crain, Ltd.

(57) ABSTRACT

In an apparatus for recording and/or reproducing information, which reproduces servo information being recorded on a medium and conducts a tracking operation based on the servo information, a power save part conducts a power save operation by reducing an operation clock frequency in accordance with a predetermined process during a tracking operation, during a seek operation, and/or during spindle motor startup.

13 Claims, 20 Drawing Sheets

FIG.1
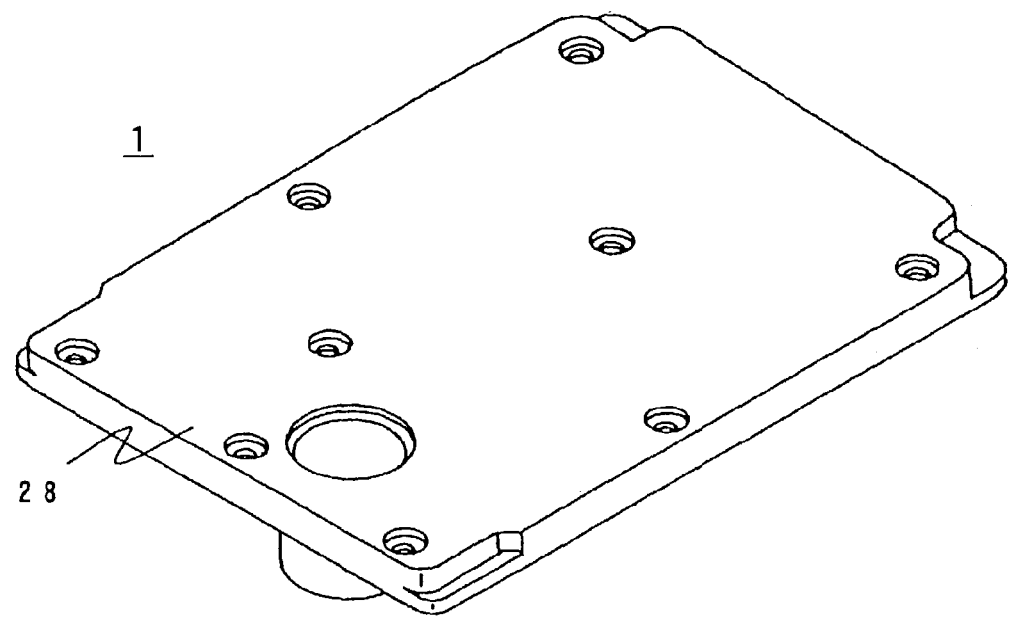
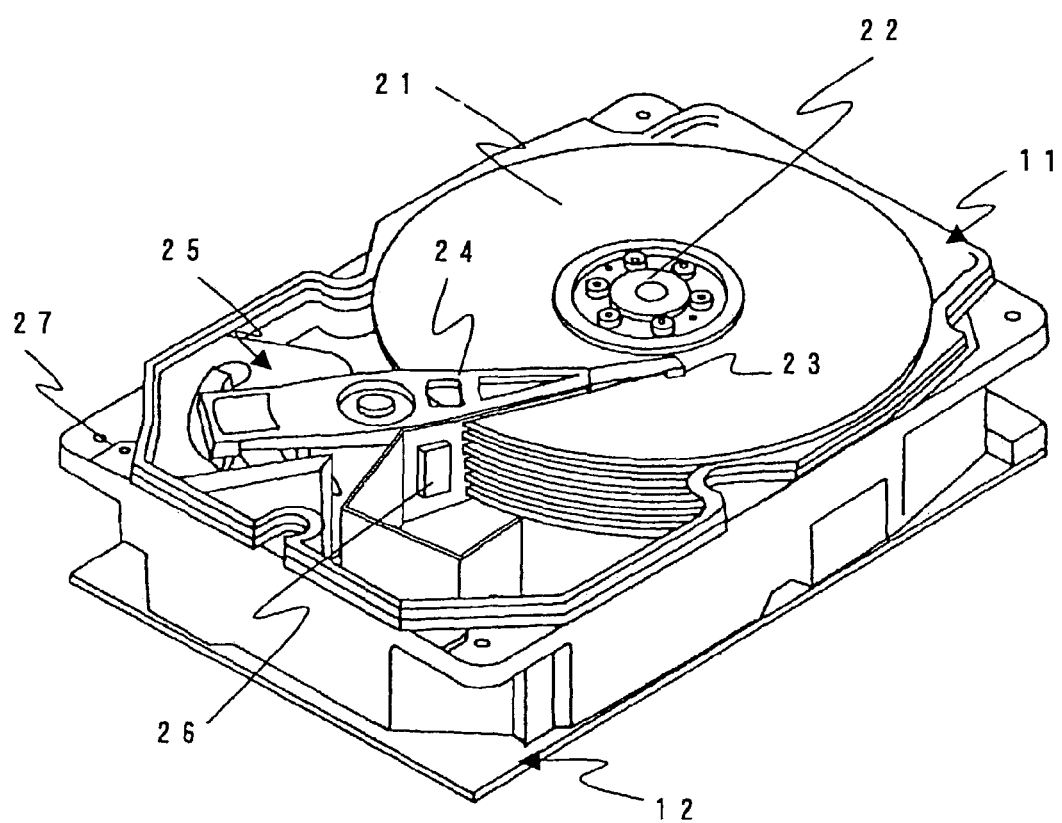

APPARATUS FOR RECORDING OR/AND REPRODUCING INFORMATION AND METHOD FOR REDUCING POWER CONSUMPTION THEREOF

BACKGROUND OF THE INVENTION

1. Field of the Invention

The present invention generally relates to apparatus for recording or/and reproducing information and methods for saving power thereof, and more particularly to apparatus for recording or/and reproducing information to/from a medium and a method for saving power thereof.

Recently, saving power in electronic devices has become more important. Also, saving power in information recording/reproducing apparatus such as a magnetic disk apparatus has been desired. Especially, in the information recording/reproducing apparatus such as a magnetic disk apparatus, the rotation speed of the medium and a driving clock for an internal LSI (Large scale Integration) have increased every year, and access time has shortened. In addition, regardless of increasing the rotation speed of the medium, an activate or start-up time until a regular rotation is reached has also been shortened. However, current use has increased and power consumption has increased while making the activation time shorter.

2. Description of the Related Art

FIG. 1 is a perspective view of a magnetic disk apparatus. FIG. 2 is a block diagram of the magnetic disk apparatus. The magnetic disk apparatus 1 includes an enclosure 11 and a printed circuit substrate 12. The enclosure 11 includes a magnetic disk 21, a spindle motor (SPM) 22, a magnetic head 23, a head arm 24, a voice coil motor (VCM) 25, and a head IC 26, which are mounted inside a case 27 and a case cover 28.

The magnetic head 23 is fixed to a tip of head arm 24 and arranged facing towards the magnetic disk 21. A recording current corresponding to data or other information is supplied from the head IC 26 to the magnetic head 23 when information is recorded. Magnetic flux is generated by the recording current at the magnetic head 23. The magnetic flux generated by the magnetic head 23 affects the magnetic disk 21 and magnetizes the magnetic disk 21. As described above, the information is magnetically recorded to the magnetic disk 21.

Also, when the information is reproduced, the magnetic pattern of the magnetic disk 21 affects the magnetic head 23 and a reproducing signal occurs in the magnetic head 23. The reproducing current is supplied to the head IC 26. The head IC 26 amplifies the reproducing current from the magnetic head 23 and supplies it to the printed circuit substrate 12.

The print circuit substrate 12 includes an HDC (Hard Disk Drive Controller) 31, a buffer memory 32, an RDC (Read Channel) 33, an SVD (Servo Demodulator) 34, a DSP (Digital Signal Processor) 35, an SVC (Servo Combo) 36, an MCU (Micro-Control Unit) 37, a memory 38, and an oscillator 39. The RDC 33 modulates record information, generates a record signal, and supplies the head IC 26, and demodulates information from the reproducing signal from the head IC 26 and supplies it to the HDC 31. The HDC 31 controls the buffer memory 32, a SCSI (Small Computer System Interface) protocol control, and an ECC (Error Correction Code) control as well as controlling reproducing and recording operations by a formatter function.

The reproducing signal is supplied from the RDC 33 to the SVD 34. The SVD 34 demodulates servo information from the reproducing signal from the RDC 33. The servo information demodulated by the SVD 34 is supplied to the MCU 37 and the DSP 35. The MCU 37 and the DSP 35 independently operate by firmware recorded in the memory 38, and control the RDC 33, the SVD 34, the SVC 36, and HDC 31.

FIG. 3 is a diagram showing a supply path of the internal clock of the magnetic disk apparatus. In FIG. 3, parts that are the same as the ones in FIG. 2 are indicated by the same reference numerals and the explanation thereof will be omitted.

The oscillator 39 oscillates at an oscillation frequency of 20 MHz. An output oscillating signal of the oscillator 39 is supplied to the SVD 34, the DSP 35, and the MCU 37. The SVD 34 and DSP 35 divide an oscillating signal of a frequency 20 MHz from the oscillator 39 by using a PLL circuit or the like, generate an operating clock, and conduct a process based on the operation clock.

In addition, the MCU 37 divides the oscillating signal of the frequency 20 MHz from the oscillator 39 by using the PLL circuit or the like, generates an operation clock, and conducts a process based on the operation clock. The MCU 37 multiplies the oscillating signal of the frequency 20 MHz from the oscillator 39 by using the PLL circuit or the like, generates a clock of a frequency 40 MHz by dividing the oscillating signal, and supplies the clock to the HDC 31 and RDC 33. The HDC 31 and the RDC 33 generate an operation clock from the clock of the frequency 40 MHz, and conduct a process based on the operation clock.

At this time, for example, the MCU 37 can conduct a power save based on the firmware. Conventionally, as a power save of the magnetic disk apparatus 1, generally, the following first, second, and third power save approaches are used.

As for the first power save approach, if a command is not issued from an upper apparatus within a predetermined time, the HDC 31, the SVD 34, and the DSP 35 normally operate only when the MCU 37 reads. Otherwise, the HDC 11, the SVD 34, and the DSP 35 are placed in a partial power save status. In the first power save mode, power consumption can be reduced for the magnetic disk apparatus 1 in a tracking operation in which a recording/reproducing operation is not conducted to the magnetic disk 21. However, power save for the head IC 26 is not conducted.

In the second power save approach, the operation clocks of the HDC 31, the RDC 33, the SVD 34, the DSP 35, and MCU 37 are slowed. Power consumption can be reduced because the HDC 31, the RDC 33, the SVD 34, the DSP 35, and MCU 37 normally operate at high speed.

Furthermore, the third power save approach sets a switch ON by a transistor or the like between each of various LSIs such as the HDC 31, the RDC 33, the SVD 34, the DSP 35, and the MCU 37, and each power source thereof, when the magnetic disk apparatus 1 is activated. In the third power save approach, the power consumption can be reduced by stopping unnecessary operations of the LSIs when the magnetic disk apparatus 1 is activated but has not reached steady state.

In a recent magnetic disk apparatus, power consumption has increased because the rotation speed and the operation clock frequency are increased. Accordingly, actual power consumption has increased more than the power consumption has been reduced by the first power save, the second power save, and the third power save approaches described above. Therefore, it is desired to further improve the power save approaches.

SUMMARY OF THE INVENTION

It is a general object of the present invention to provide apparatus for recording or/and reproducing information to/from a medium and methods for saving power thereof in which the above-mentioned problems are eliminated.

Another object of the present invention is to provide an apparatus for recording or/and reproducing information to/from a medium and a method for saving power thereof, in which power consumption can be reduced during a tracking operation, a seek operation, and/or while activating a spindle motor.

The above and other objects of the present invention can be achieved by an apparatus for recording and/or reproducing information that reproduces servo information being recorded on a medium and conducts a tracking operation based on the servo information. In one embodiment, the apparatus has a power save part conducting a power save operation by reducing an operation clock frequency in accordance with a predetermined process during a tracking operation, and increasing the clock frequency during reading and writing operations.

Moreover, in apparatus according to the present invention, the power save part may conduct the power save operation by reducing a number of tracking controls.

Furthermore, in another aspect of the present invention, the power save part may conduct the power save operation by reducing an operation clock during the tracking operation.

Alternatively, the power saving aspect of the present invention can be achieved by an apparatus for recording and/or reproducing information to/from a medium by rotating the medium by a spindle motor, the apparatus including a power save part for conducting a power save operation until the spindle motor achieves a regular rotation speed.

According to the present invention, during the tracking operation, for example, it is possible to reduce power consumption when waiting for a command from an upper apparatus. It is also possible to reduce the power consumption at a time of the seek operation. Furthermore, according to the present invention, it is possible to reduce power consumption when the apparatus is activated.

By using various methods described above, it is possible to greatly reduce the power consumption other than during a recording operation and/or a reproducing operation.

BRIEF DESCRIPTION OF THE DRAWINGS

Other objects, features, and advantages of the present invention will become more apparent from the following detailed description when read in conjunction with the accompanying drawings, in which:

FIG. 1 is a perspective view of a magnetic disk apparatus;

DESCRIPTION OF THE PREFERRED EMBODIMENTS

Figure 4:
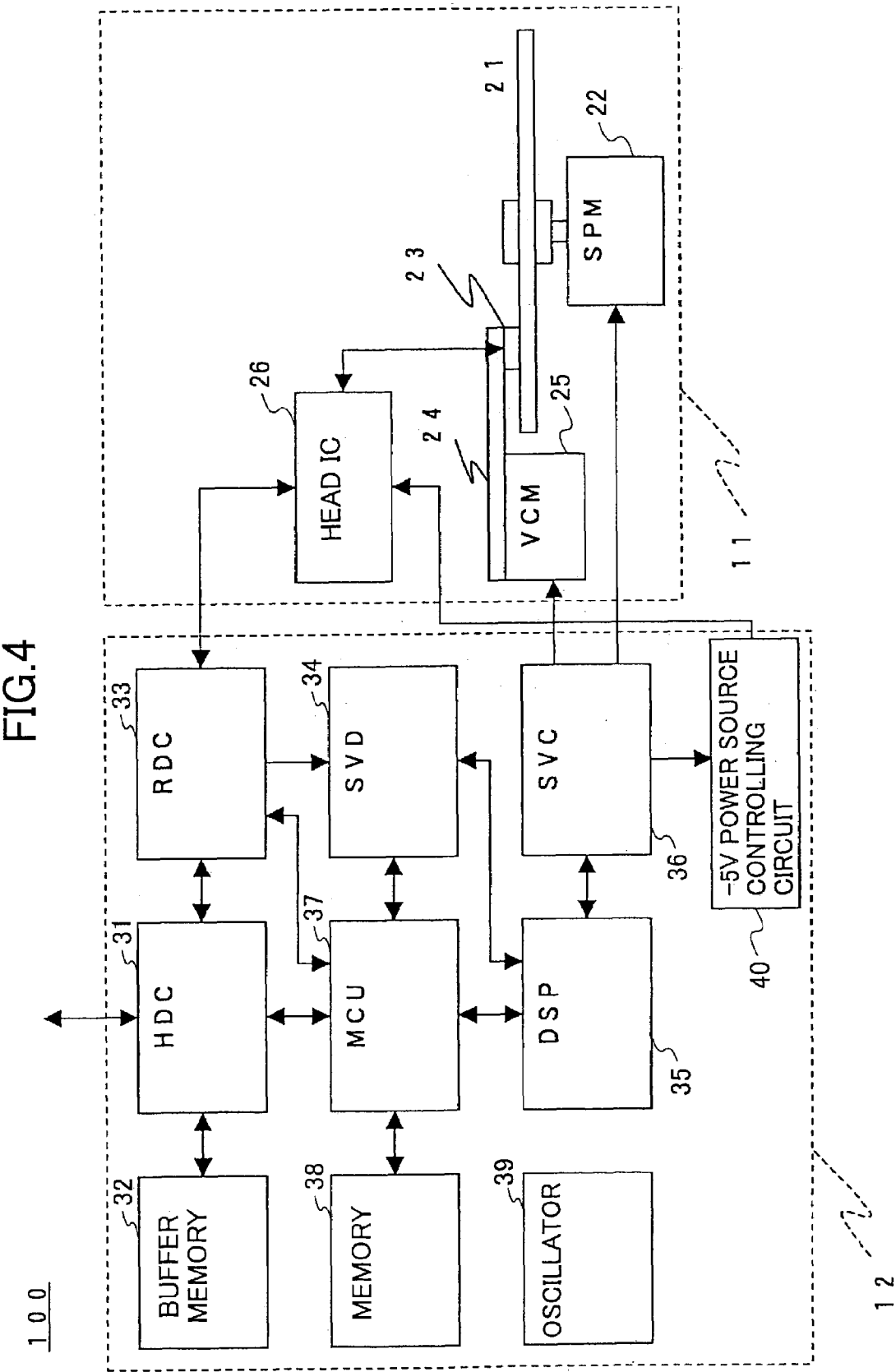
FIG. 4 is a block diagram showing a magnetic disk apparatus according to an embodiment of the present invention.

FIG. 4 is a block diagram showing a magnetic disk apparatus according to an embodiment of the present invention. In FIG. 4, parts that are the same as the ones in FIG. 2 are indicated by the same reference numerals and the explanation thereof will be omitted.

Figure 2:
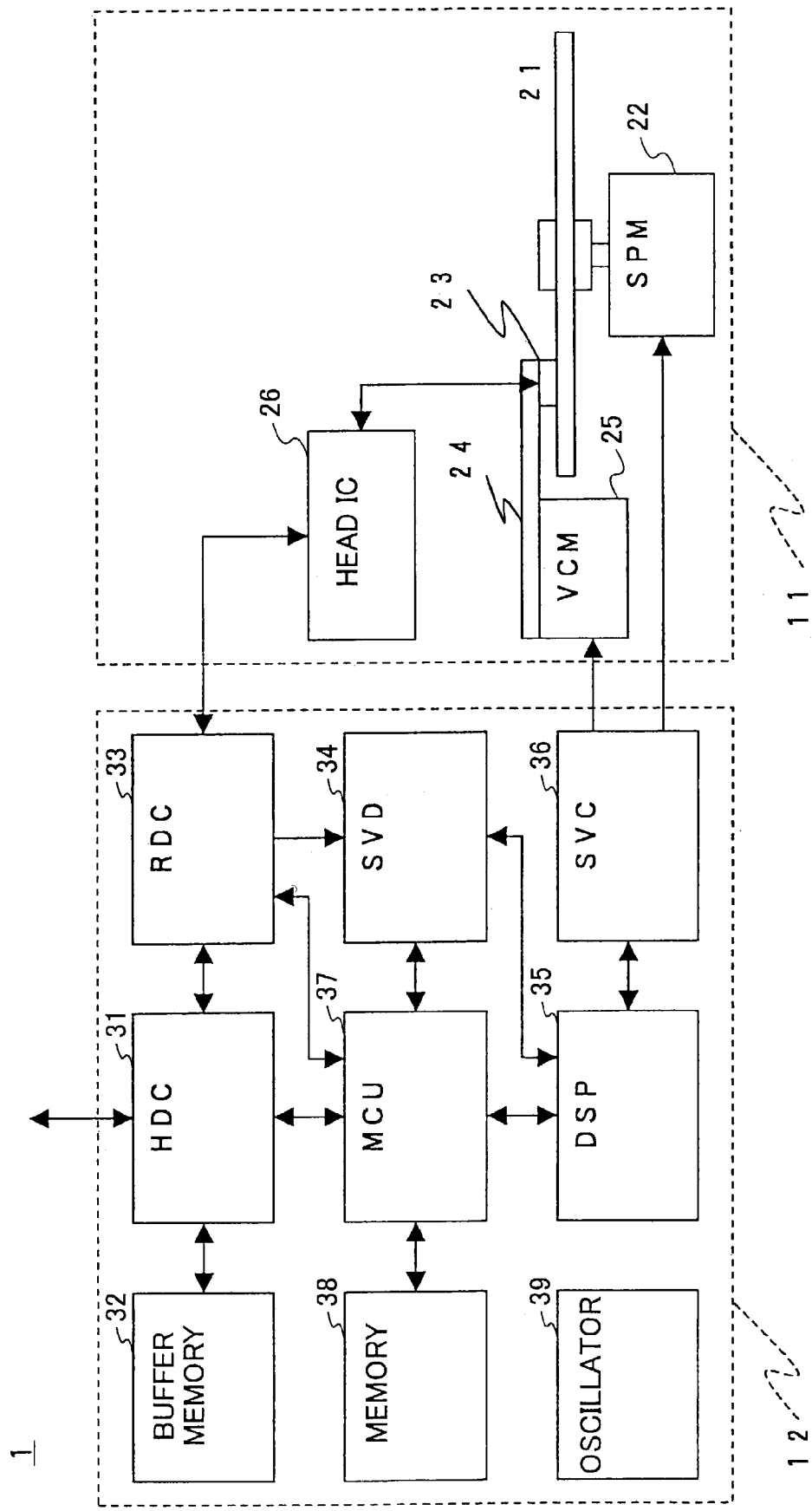
FIG. 2 is a block diagram of the magnetic disk apparatus of FIG. 1.
Figure 3:
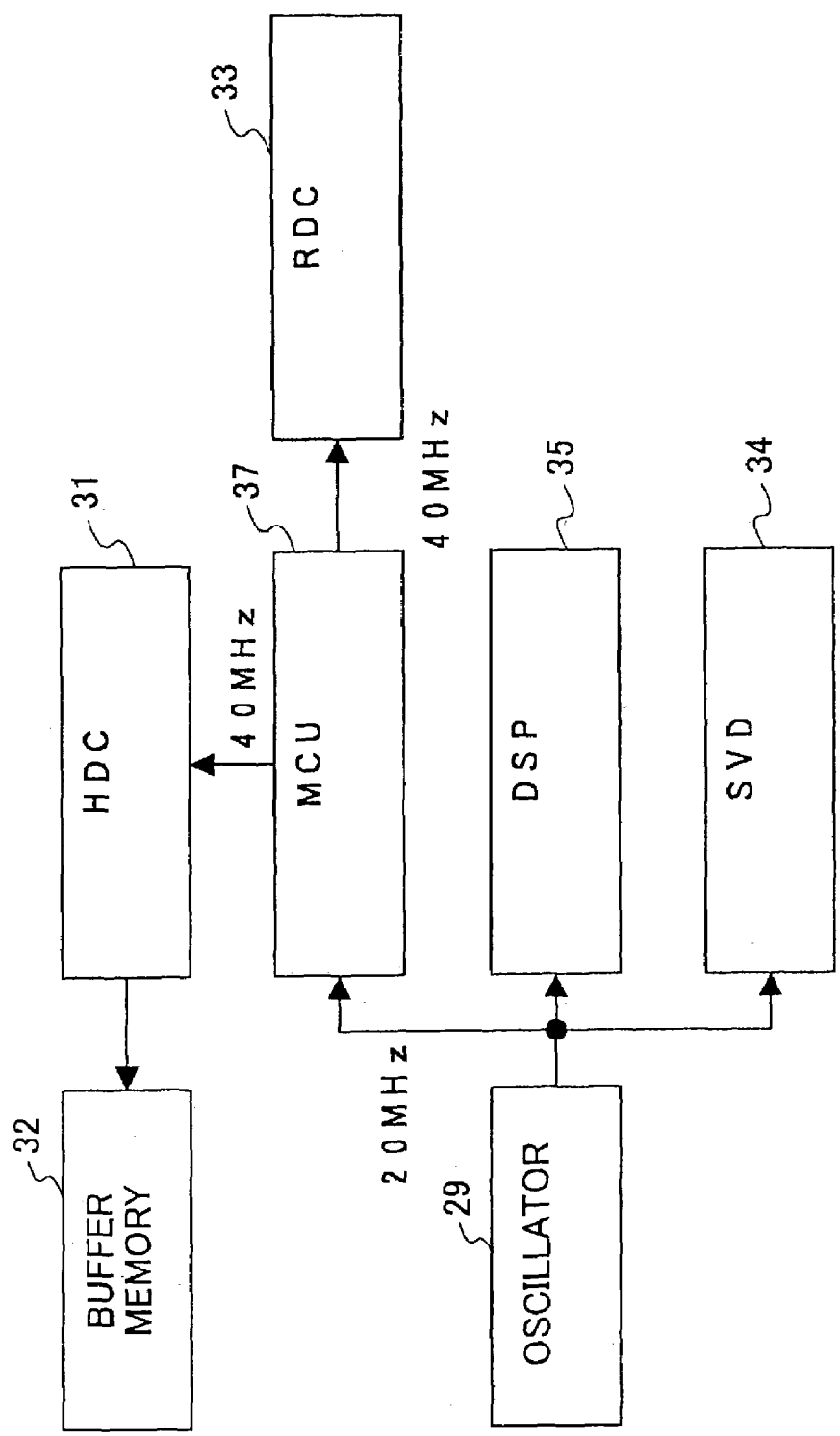
FIG. 3 is a diagram showing a supply path of an internal clock of the magnetic disk apparatus of FIG. 1.

In a magnetic disk apparatus 100 according to the embodiment of the present invention, firmware for saving power of a MCU 37 and a DSP 35 is different from that of the magnetic disk apparatus 1 shown in FIG. 1 and FIG. 2. In addition, the magnetic disk apparatus 100 includes a −5V power source controlling circuit 40 different from the magnetic disk apparatus 1 shown in FIG. 1 and FIG. 2.

Figure 5:
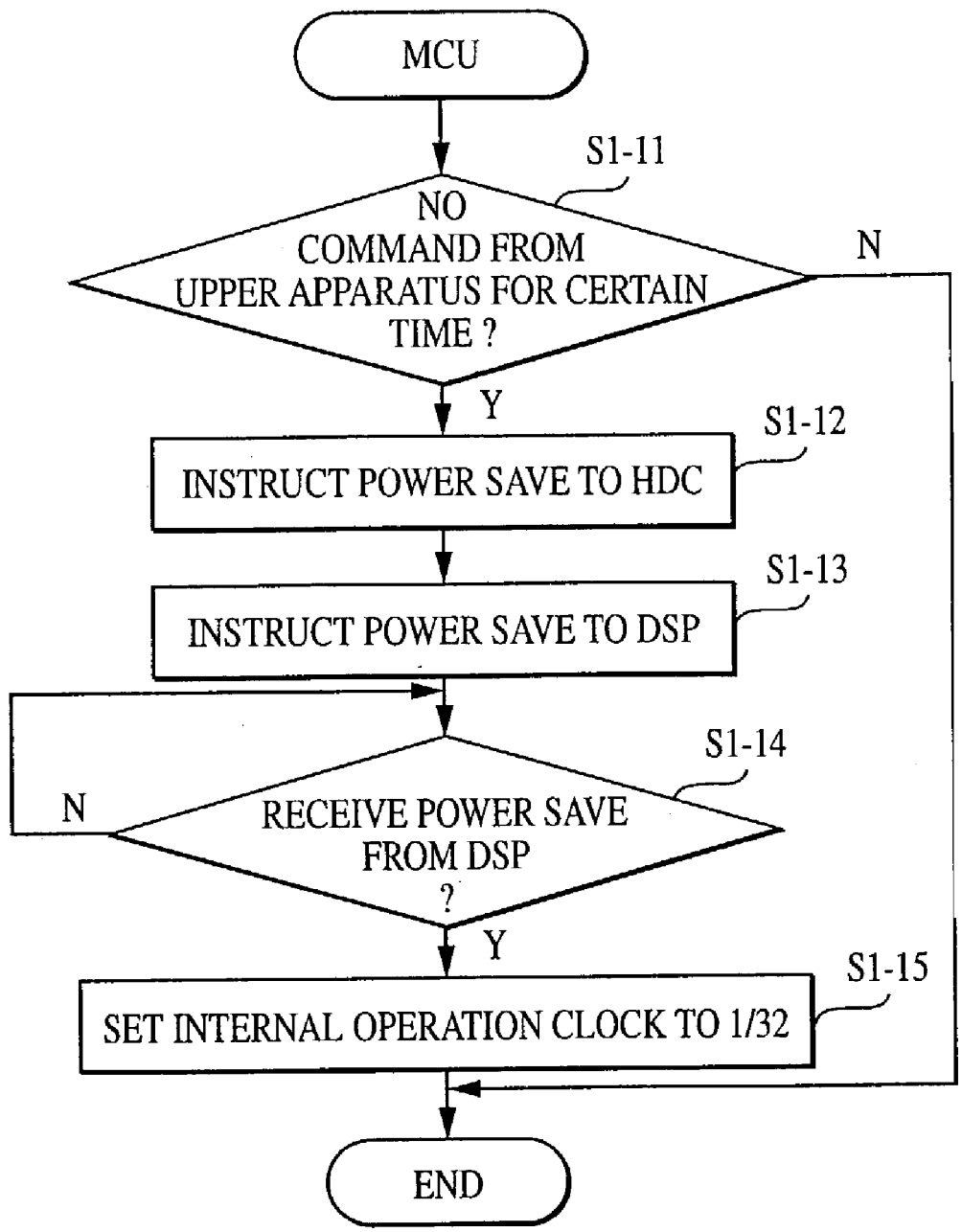
FIG. 5 is a flowchart for explaining a process for saving power in an MCU.
Figure 6:
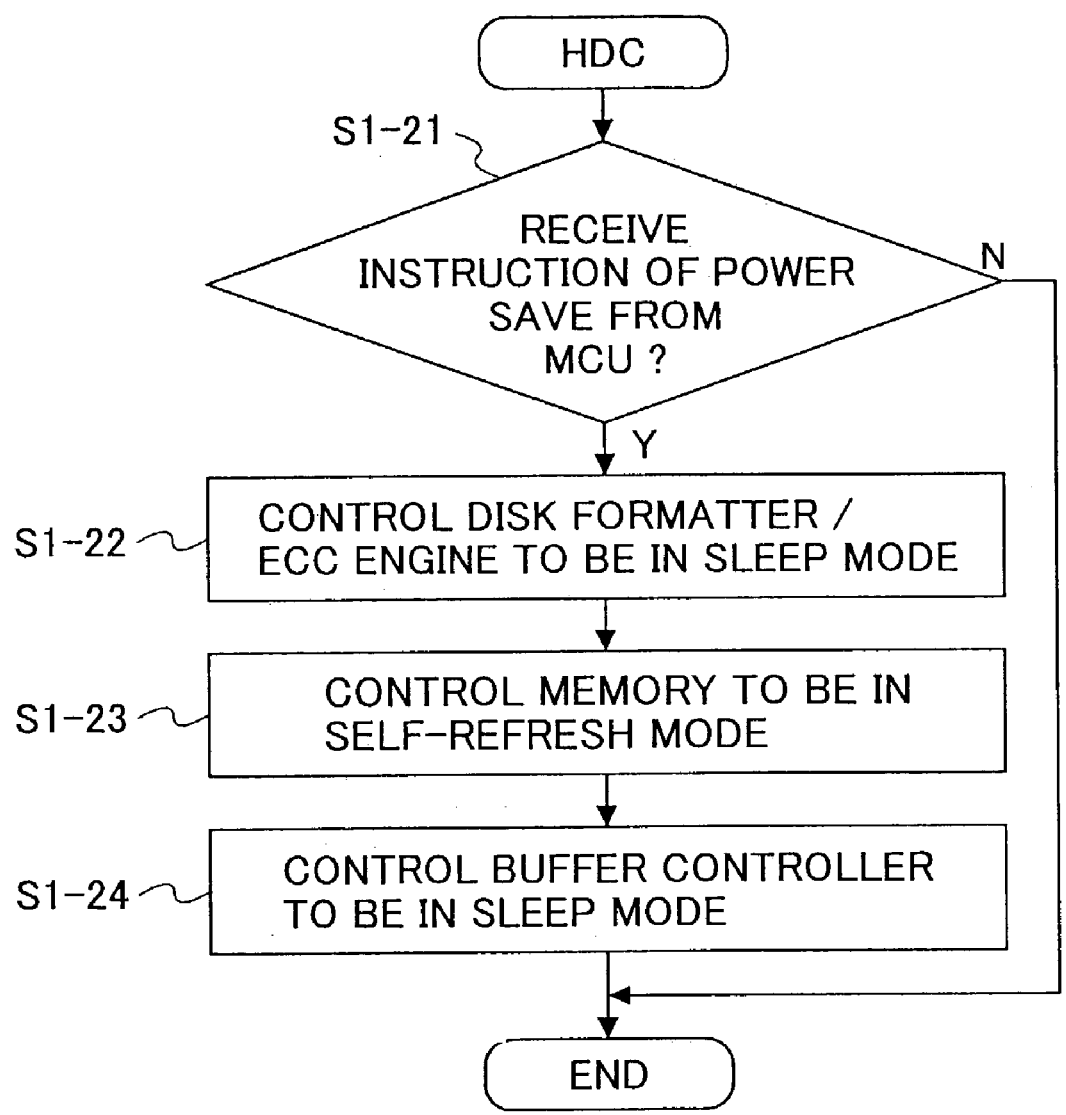
FIG. 6 is a flow chart for explaining a process for saving power in an HDC.
Figure 7:
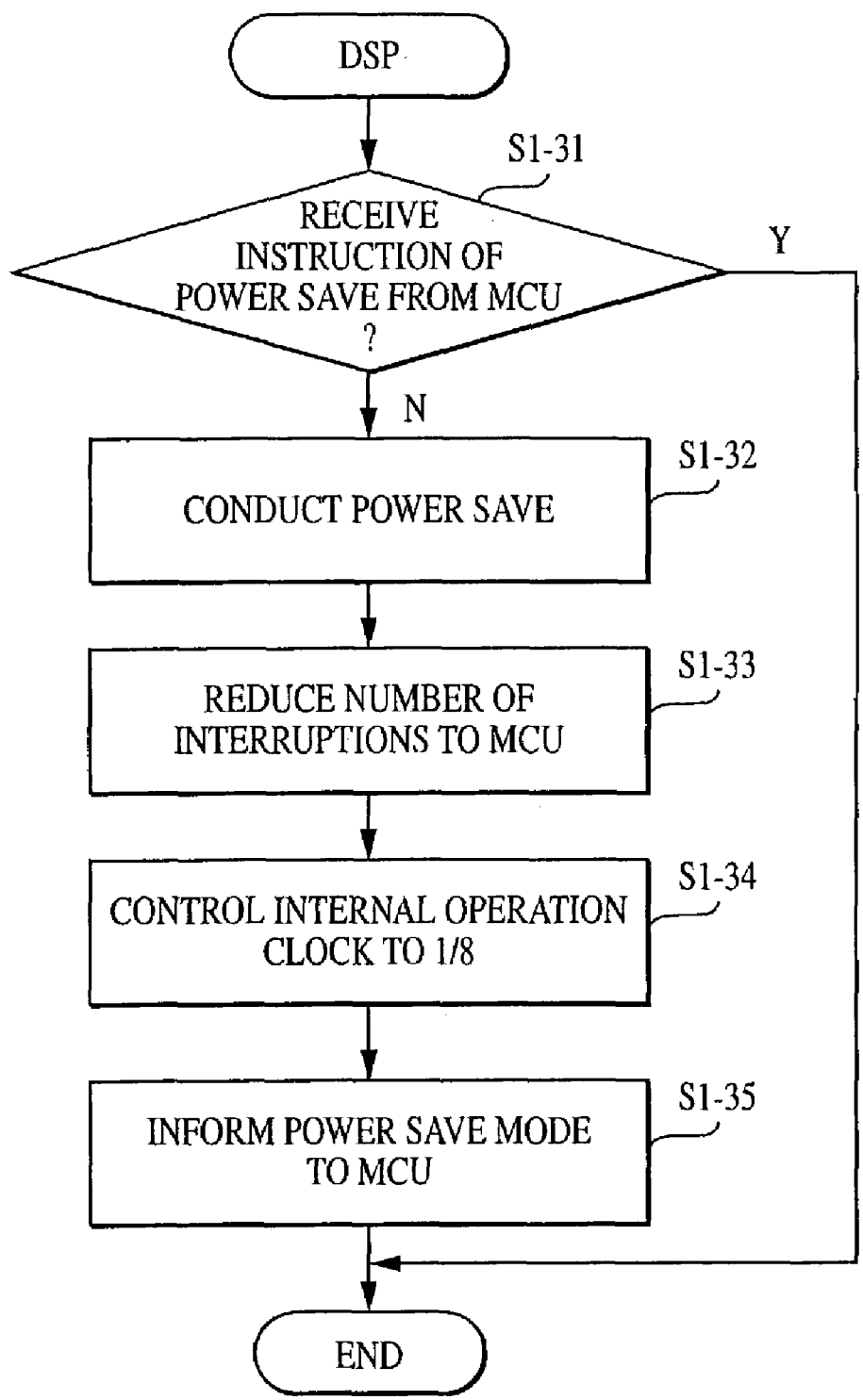
FIG. 7 is a flowchart for explaining a process for saving power in a DSP.

FIG. 5 is a flowchart for explaining a process when power of the MCU 37 is saved. FIG. 6 is a flow chart for explaining a process when power of the HDC 31 is saved. FIG. 7 is a flowchart for explaining a process when power of the DSP 35 is saved.

As shown in FIG. 5, when the MCU 37 has not received a command for a predetermined time from an upper apparatus in step S1-11, the MCU 37 instructs a power save to the HDC 31 in step S1-12.

When the HDC 31 receives an instruction to perform a power save operation from the MCU 37 in step S1-21 as shown in FIG. 6, the HDC 31 allows a disk formatter/ECC engine to enter a sleep mode in step S1-22. Moreover, the HDC 31 allows the memory 38 to enter a self-refresh mode in step S1-23. Furthermore, the HDC 31 allows a buffer controller to enter a sleep mode in step S1-24.

The MCU 37 can issue a power save command to the DSP 35 in step S1-13, as shown in FIG. 5. When the DSP 35 receives the command to enter the power save mode from the MCU 37 in step S1-31, as shown in FIG. 7, the DSP 35 enters the power save mode of the RDC 33, SVC 36, and the head IC 26 in step S1-32.

A power save operation of the RDC 33 will be described. The RDC 33 includes a VGA (Variable Gain Amplifier) and an ASC (Amplitude Asymmetry Correction). The VGA and ASC are circuits that conduct waveform shaping for a reproduction signal reproduced by the magnetic head 23.

The RDC 33 stops operations of the VGA and the ASC in response to the instruction of the power save from the MCU 37. For example, an operation control is conducted by applying a constant input signal from the MCU 37 to the RDC 33 or stopping an operation clock supplied to the VGA and the ASC. Thus, it is possible to reduce the power consumption of the RDC 33. It should be noted that the power save operation of the RDC 33 is executed by the MCU 37 that records data in a particular register provided to the RDC 33.

The power save operation of the SVD 34 will be described. In the SVD 34, an ADC (Analog Digital Converter), a PLL (Phase Locked Loop) circuit, and an AGC (Automatic Gain Control) circuit are internally provided. The ADC is a circuit for converting servo information from an analog signal to digital data. The PLL circuit is a circuit for generating an internal clock. The AGC circuit is a circuit for regulating the amplitude of an input signal to be constant. The SVD 34 controls operations of these internal circuits in response to the power save instruction and conducts the power save. For example, the SVD 34 stops a conversion of the ADC. Also, the PLL circuit and the AGC circuit stop operations by regulating control signals supplied to circuits. Therefore, it is possible to reduce power consumption.

The power save operation of the SVD 34 is executed by the DSP 35 recording data to a particular register that is internally provided to the SVD 34.

The power save mode of the head IC 26, which is a circuit for recording information to the medium or receiving and sending information from and to the medium, will be described in detail. A power save operation of the spindle motor 22 when the spindle motor 22 is started, will also be described.

Figure 8:
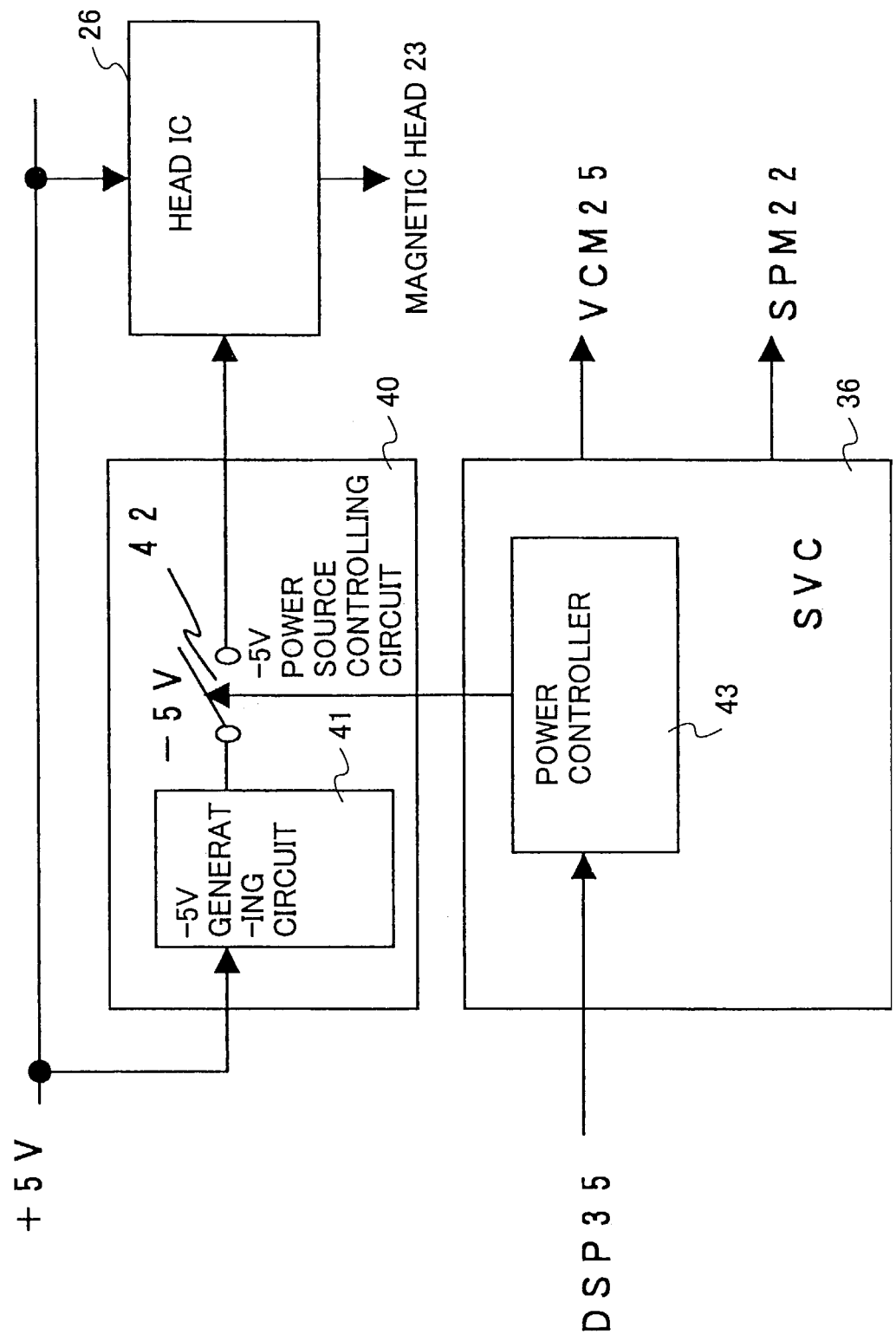
FIG. 8 is a block diagram of a configuration of a −5V power source controlling circuit as a head IC power source circuit.

FIG. 8 is a block diagram of a configuration of the −5V power source controlling circuit 40 as a head IC power source circuit. The −5V power source controlling circuit 40 includes a −5V power source generating circuit 41 and a switch 42.

The −5V power source generating circuit 41 generates −5V power source voltage from a power source voltage 5V. The −5V power source voltage generated by the −5V power source generating circuit 41 is supplied to the switch 42. The switch 42 is provided between the −5V power source generating circuit 41 and the head IC 26. When the switch 42 is ON, −5V power source voltage generated by the −5V power source generating circuit 41 is supplied to the head IC 26. When the switch 42 is OFF, the −5V power source voltage is not supplied to the head IC 26. When the spindle motor 22 is activated, the switch 42 is switched by a switch controlling signal from a power source controller 43. Accordingly, the power save operation of the head IC 26 is conducted when the spindle motor is activated.

The power source controller 43 is provided to the SVC 36. The power source controller 43 turns On the switch 42 in response to the instruction of the power save and turns OFF in response to an instruction of a power save release.

Also, the DSP 35 drops the number of interruptions to the MCU 37 due to the servo control in step S1-33. For example, the DSP 35 drops the number of the interruptions to the MCU 37 by dividing the operation clock. Accordingly, the time required for an instruction process becomes longer.

A power save operation of the spindle motor 22 after the spindle motor 22 is activated will be described. In a case of a regular power save after the spindle motor 22 is started, the head IC 26 controls a sense current so as not to supply it to the magnetic head 23. Moreover, in a case of the regular power save after the spindle motor 22 is activated, the head IC 26 cuts power to an amplifier for amplifying a signal recorded to the magnetic disk 21. These operations by the head IC 26 are conducted by the MCU 37 or the DSP 35 that writes a value to a particular register internally provided in the head IC 26.

A process for dropping the number of interruption processes will be described with reference to FIGS. 9A, 9B, and 9C. FIG. 9A is a diagram showing a servo gate signal. FIG. 9B is a diagram showing a timing chart of the interruption process of the DSP 35. FIG. 9C is a diagram showing a timing chart of the interruption process of the MCU 37.

The DSP 35 rises at the same time that the servo gate signal rises as shown in FIG. 9B, and starts the interruption process for the servo control. The MCU 37 starts the interruption process for the servo control at a certain time t0 passed after the servo gate signal rises, as shown in FIG. 9C.

Figure 9:
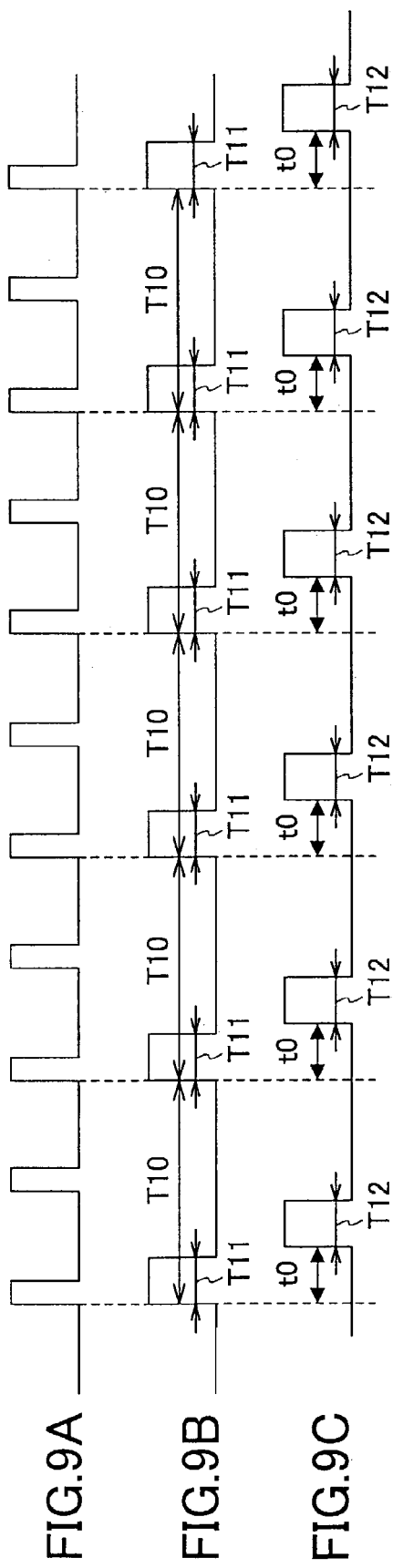
FIG. 9A is a diagram showing a servo gate signal.
FIG. 9B is a diagram showing a timing chart of the interruption process of the DSP.
FIG. 9C is a diagram showing a timing chart of the interruption process of the MCU.

For example, as shown in FIGS. 9A, 9B, and 9C, the DSP 35 and the MCU 37 conduct the interruption process every two servo signals. That is, a process for obtaining servo information is conducted during every other servo information gate but not during every servo information gate. Because the number of interruption processes for the DSP 35 and the MCU 37 are reduced, the number of interruption processes becomes half the number of regular interruption processes for the servo control. Therefore, it is possible to reduce power consumption. By dividing the operation clocks of the DSP 35 and the MCU 37, an interval of the interruption process becomes longer and is a time T10 as shown in FIG. 9. Thus, the number of interruption processes is reduced. In addition, interruption process times become longer to a time T11 and a time T12 for the DSP 35 and the MCU 37, respectively. Accordingly, it is possible to further reduce power consumption.

It should be noted that the interruption process is not limited to be conducted every two gates. If the interruption process is conducted more than every two gates or multiple gates, an effect of the power consumption can be further expected.

Referring to FIG. 7 again, the flowchart of the process when the power of the DSP 35 is saved will be described. Next, the DSP 35 sets the internal operation clock to be one-eighth the regular operation clock in step S1-34. Since the internal operation clock is reduced to be one-eighth the regular operation clock, the DSP 35 reduces the number of the interruptions to the MCU 37. Accordingly, power consumption can be reduced. When the DSP 35 is in a power save state, the DSP 35 issues a power save notice to the MCU 37 that the DSP 35 is in the power save state, in step S1-35.

When the MCU 37 receives the power save notice from the DSP 35 in step S1-14 as shown in FIG. 5, the MCU 37 sets a frequency of the internal operation clock to be one thirty-second of the frequency of the regular operation clock in step S1-15. Since the frequency of the internal operation clock becomes one thirty-second of the frequency of the regular operation clock, a process speed of the interruption process from the DSP 35 is reduced. Accordingly, the power consumption of the MCU 37 can be reduced.

When the magnetic disk apparatus 100 transits to the power save operation, power consumption can be greatly reduced. It should be noted that since the magnetic disk apparatus 100 continues a tracking operation, the magnetic disk apparatus 100 can speedily transit to another operation.

Next, an operation at a time of the power save release will be described.

Figure 10:
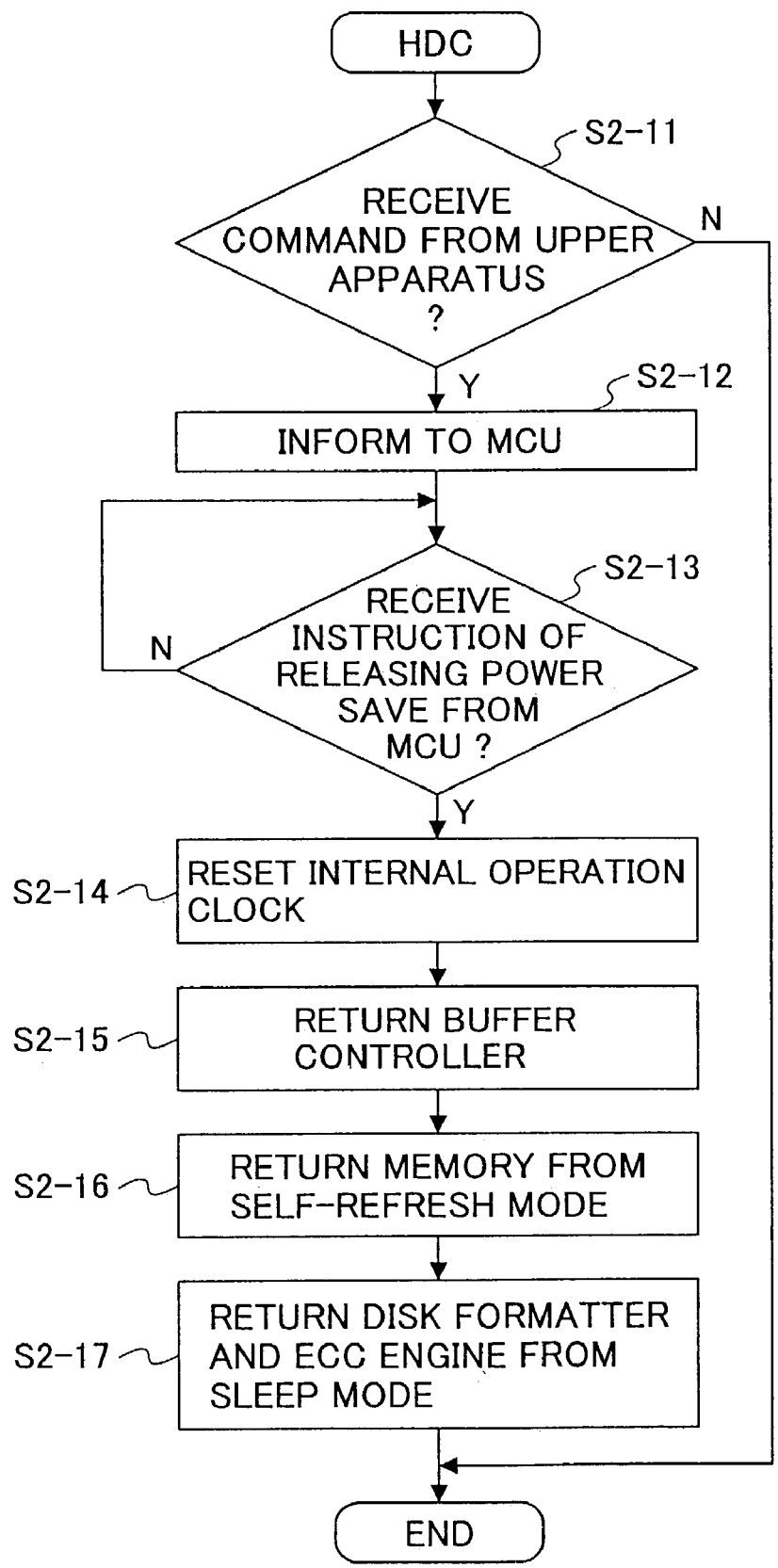
FIG. 10 is a flowchart for explaining a process of the HDC at the time of the power save release.
Figure 11:
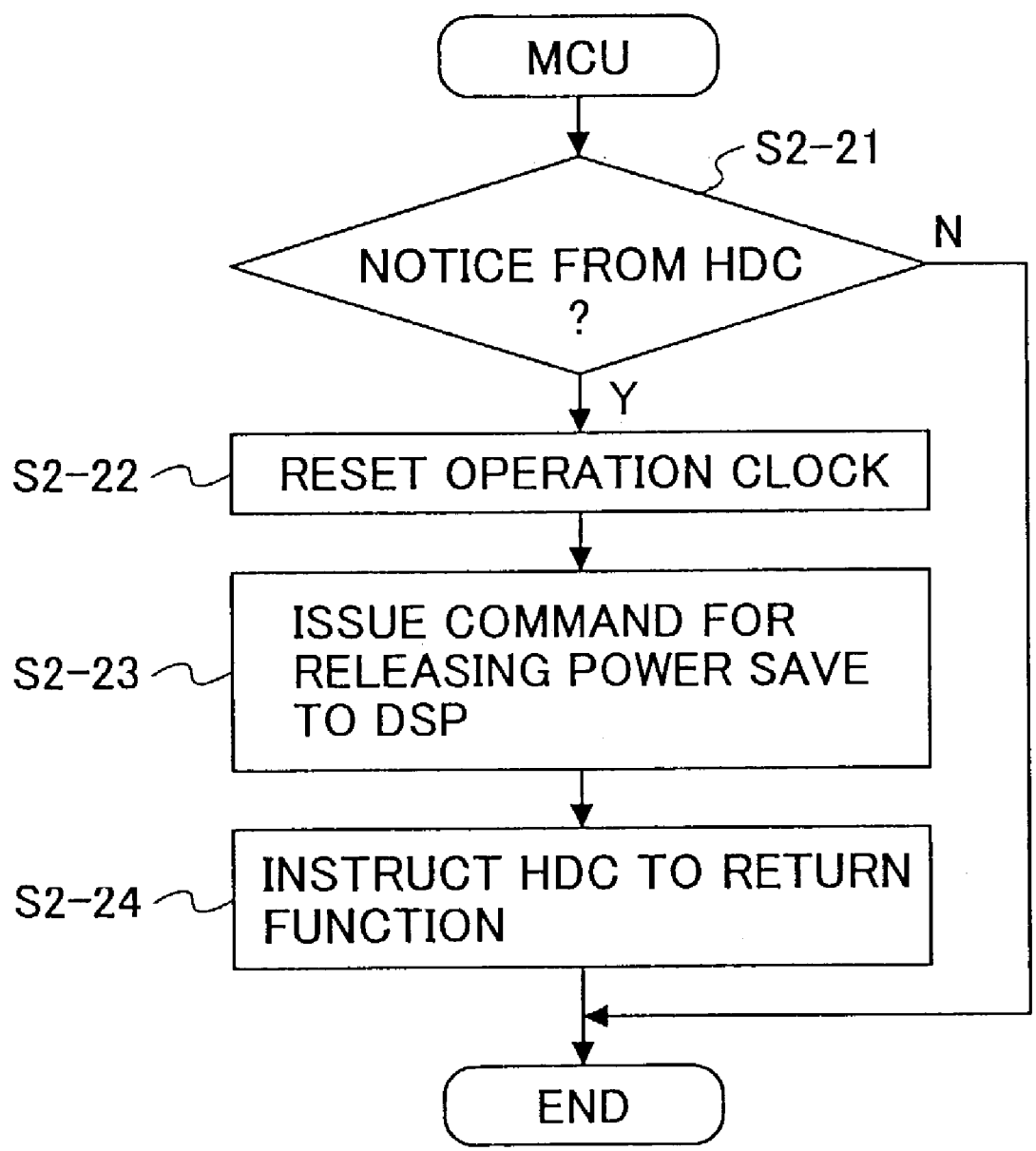
FIG. 11 is a flowchart for explaining a process of the MCU at the time of the power save release.
Figure 12:
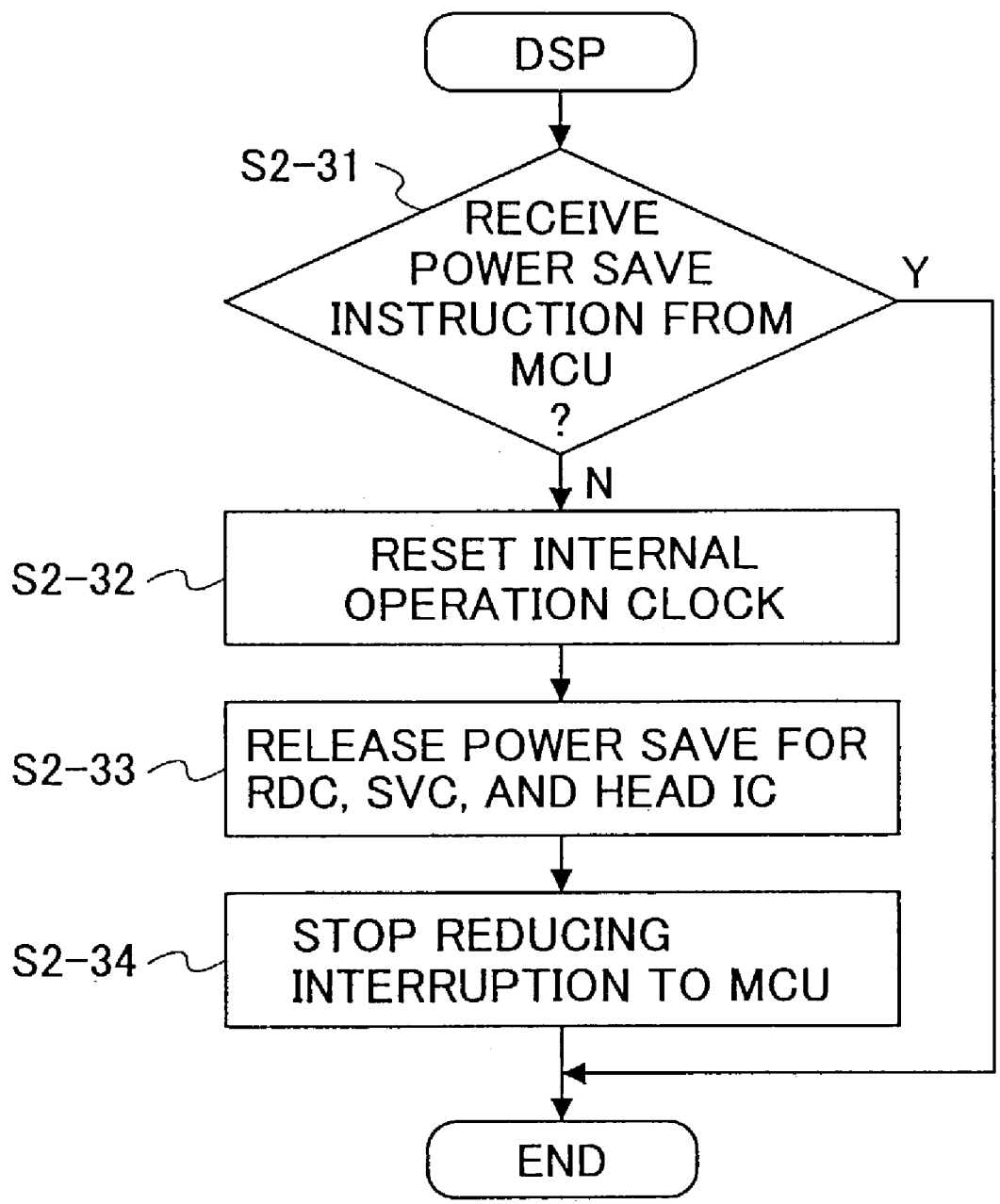
FIG. 12 is a flowchart for explaining a process of the DSP at the time of the power save release.

FIG. 10 is a flowchart for explaining a process of the HDC 31 at the time of the power save release. FIG. 11 is a flowchart for explaining a process of the MCU 37 at the time of the power save release. FIG. 12 is a flowchart for explaining a process of the DSP 35 at the time of the power save release.

When the HDC 31 receives a command from the upper apparatus in step S2-11 as shown in FIG. 10, the HDC 31 informs the MCU 37 in step S2-12. When the command is input from the upper apparatus in step S2-21 as shown in FIG. 11, the MCU 37 resets the operation clock in step S2-22. Subsequently, the MCU 37 issues a command for releasing the power save to the DSP 35 in step S2-23.

When the DSP 35 receives a command for releasing the power save command from the MCU 37 in step S2-31 as shown in FIG. 12, the DSP 35 resets the operation clock in step S2-32, releases the power save of the RDC 33, the SVD 34, and the head IC 25 in step S2-33, and stops reducing the number of interruptions to the MCU 37 in step S2-34. Moreover, the MCU 37 instructs the HDC 31 to return to a function in step S2-24 as shown in FIG. 11.

When the HDC 31 receives an instruction of returning the function from the MCU 37 in step S2-13, as shown in FIG. 10, the HDC 31 resets the internal operation clock in step S2-14. Moreover, the HDC 31 returns the buffer controller internally mounted therein in step S2-15, and returns the memory 38 from the self-refresh mode in step S2-16. Furthermore, the HDC 31 returns the disk formatter and the ECC engine from the sleep mode in step S2-17.

The magnetic disk apparatus 100 is released from the power save state by the processes described above. If a sequence of the processes described above is ignored, the MCU 37 and the DSP 35 cannot conduct their operations at an accurate timing. Accordingly, it becomes impossible for the MCU 37 and the DSP 35 to return from the power save state.

Figure 13:
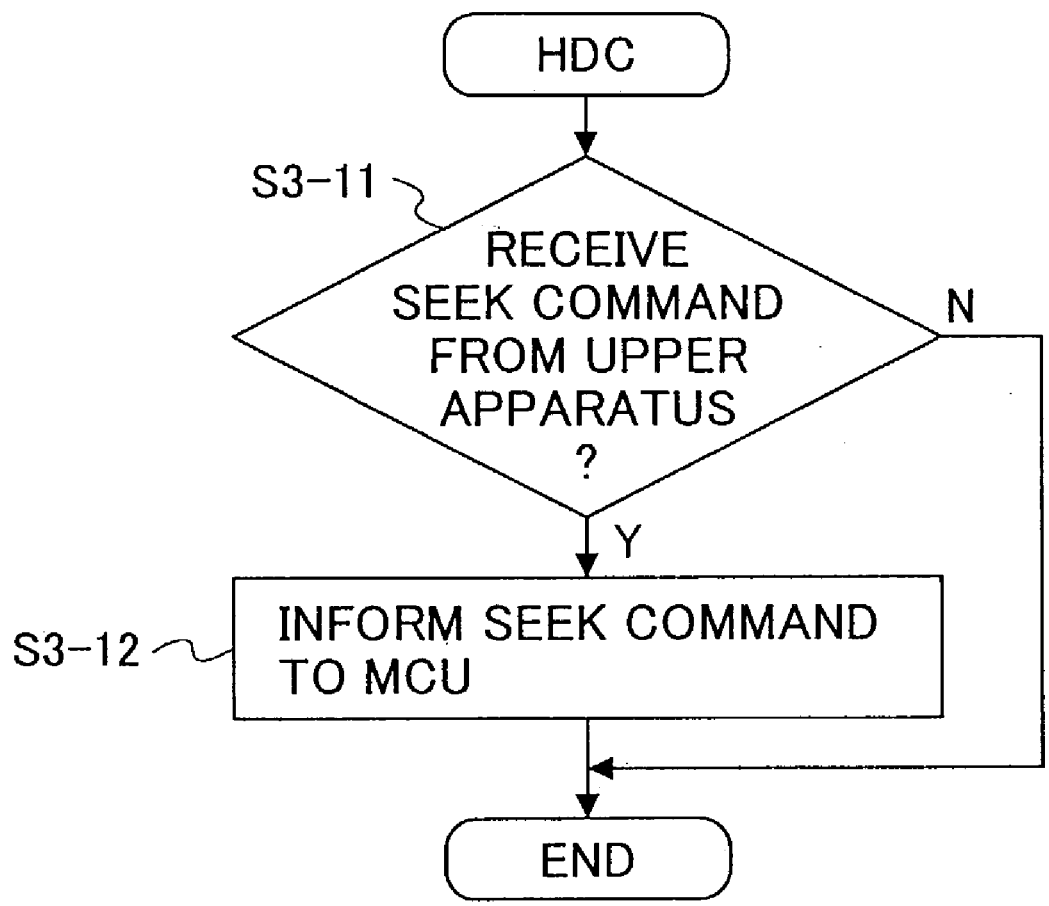
FIG. 13 is a flowchart for explaining a power save process of the HDC at the time of the seek operation.
Figure 14:
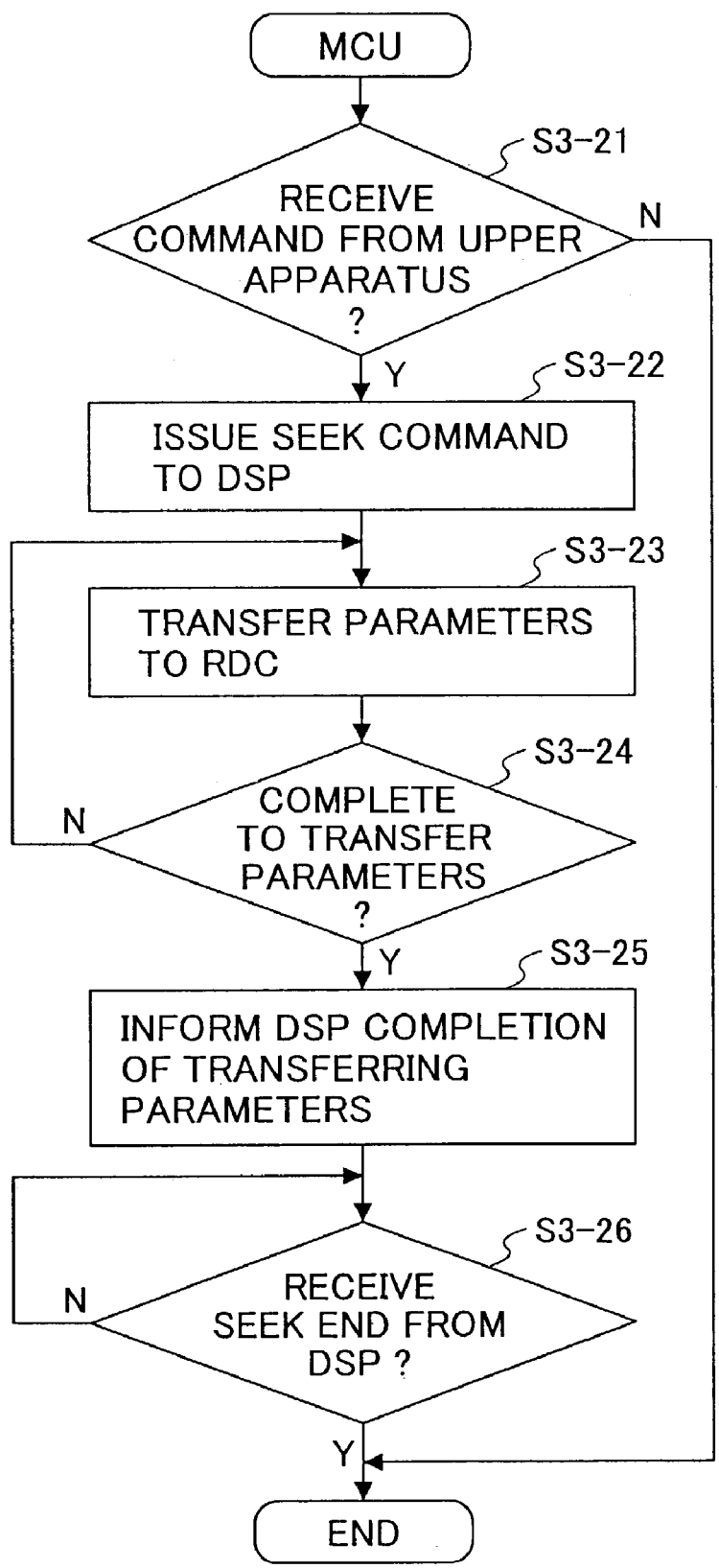
FIG. 14 is a flowchart for explaining a power save process of the MCU at the time of the seek operation.
Figure 15:
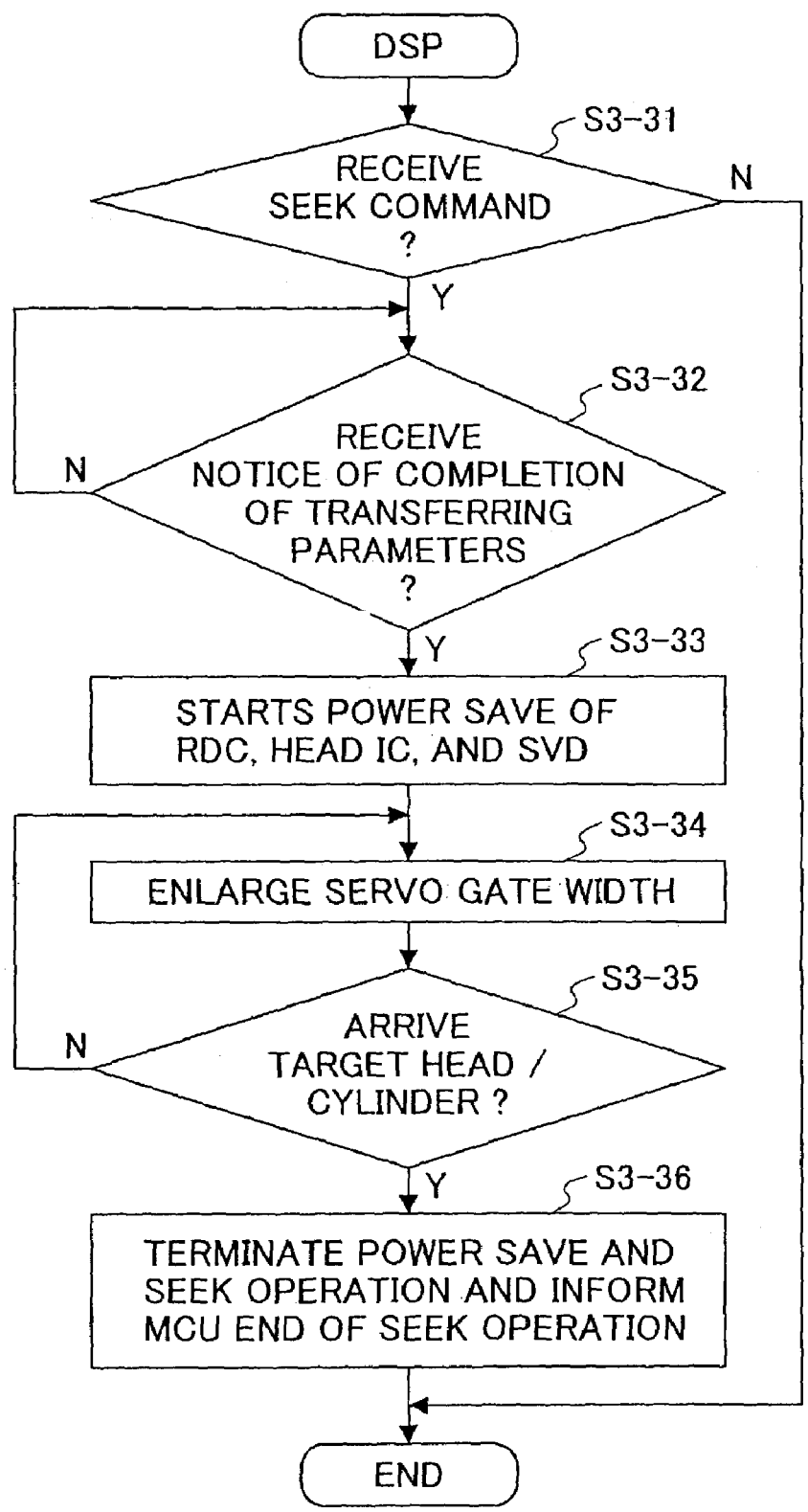
FIG. 15 is a flowchart for explaining a power save process of the DSP at the time of the seek operation.

Next, a process of the power save at a beginning of a seek operation will be described in detail. FIG. 13 is a flowchart for explaining a power save process of the HDC 31 at the time of the seek operation. FIG. 14 is a flowchart for explaining a power save process of the MCU 37 at the time of the seek operation. FIG. 15 is a flowchart for explaining a power save process of the DSP 35 at the time of the seek operation.

When the HDC 31 receives a seek command from the upper apparatus in step S3-11 shown in FIG. 13, the HDC 31 informs the MCU 37 in step S3-12. When the MCU 37 receives the seek command from the HDC 31 in step S3-21, the MCU 37 issues the seek command to the DSP 35 in step S3-22. Also, the MCU 37 transfers parameters for the RDC 33 conducting the power save in step S3-23.

The parameters from the MCU 37 are stored in a particular register of the RDC 33. By the parameters for conducting the power save being stored in the particular register, the power save of the RDC 33 is executed.

When the parameters are completely transferred to the RDC 33 in step S3-24, the DSP 35 receives a notice indicating that the parameters are completely transferred to the RDC 33, in step S3-25.

When the DSP 35 receives a seek command from the MCU 37 in step S3-31 shown in FIG. 15 and receives from the MCU 37 a notice indicating that the parameters are completely transferred in step S3-32, the DSP 35 indicates the power save to the RDC 33, the SVD 34, and the head IC 26 in step S3-33. Indications of the power save to the RDC 33, the SVD 34, and the head IC 26 are set by storing appropriate parameters in the particular registers.

Next, in order to read the servo information, the DSP 35 enlarges a servo gate expectation detection window width in step S3-34.

Figure 16:
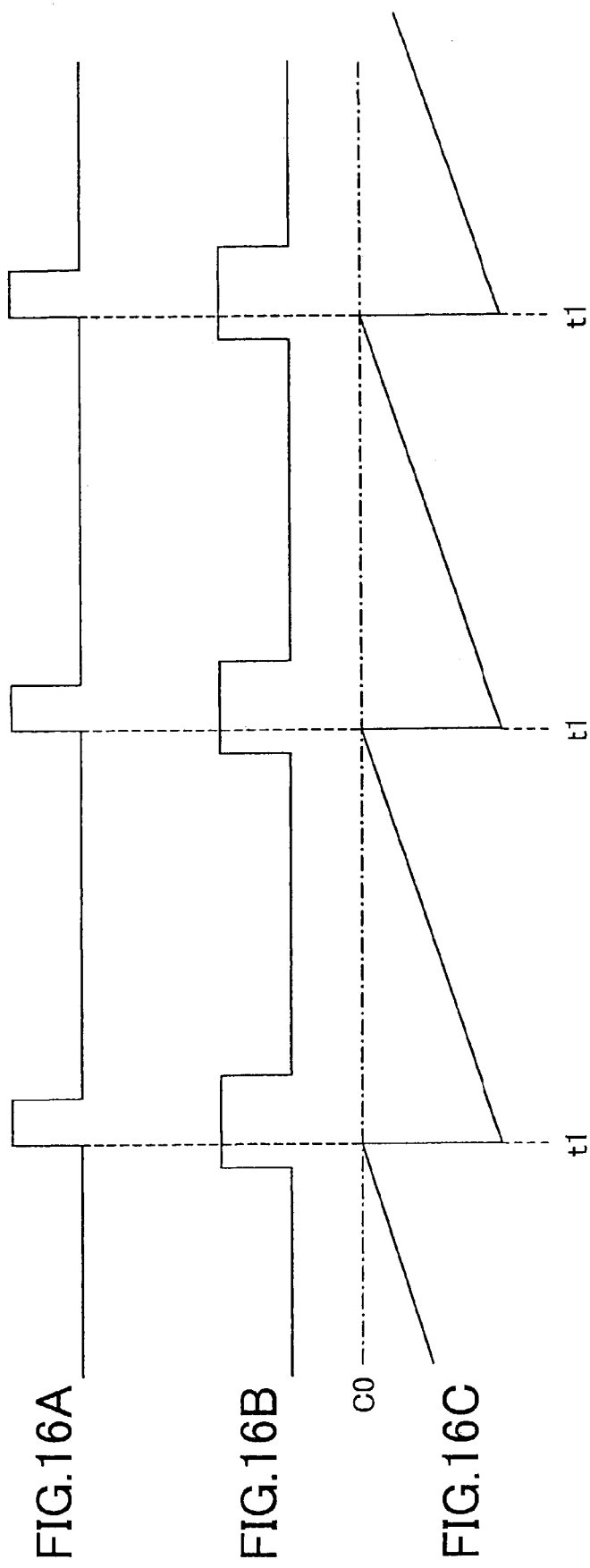
FIG. 16A is a diagram showing a servo gate signal.
FIG. 16B is a diagram showing a servo gate expectation detection window.
FIG. 16C is a diagram showing an internal count value of the DSP.

A servo gate expectation detection window generating operation will be described with reference to FIGS. 16A, 16B, and 16C. FIG. 16A is a diagram showing a servo gate signal. FIG. 16B is a diagram showing a servo gate expectation detection window. FIG. 16C is a diagram showing an internal count value of the DSP 35.

Tracks are formed on concentric circles of the magnetic disk 21 and the servo information is written on the tracks at a constant period. Moreover, a servo mark is written at the beginning of each of the servo information regions. The DSP 35 conducts the interruption process to the MCU 37 by synchronizing to the servo mark. In the interruption process, necessary information is exchanged between the DSP 35 and MCU 37. For example, the information exchanged can include a notice showing that an error is caused at a time of writing data or a notice showing that the tracking operation has failed.

Rotation of the magnetic disk 21 is maintained at a constant. Thus, the period of the servo mark appearing on one track is constant. The DSP 35 expects this timing to predict when the next servo mark appears, by using an internal counter.

For example, as shown in FIG. 16C, the internal counter starts to count when the servo mark appears at a time t1. When the internal counter achieves a predetermined count value C0, the next servo mark is expected to appear. Therefore, as shown in FIG. 16B, it is possible to generate an expectation detection window including the servo gate signal shown in FIG. 16A based on the count value shown in FIG. 16C. The servo information is detected based on the expectation detection window. Detection timing is changeable by changing the count value of the internal counter.

When the magnetic head 23 arrives at a head/cylinder position of a target in step S3-35, shown in FIG. 15, the DSP 35 terminates the power save and the seek operation and informs the MCU 37 that the power save and the seek operation are terminated in step S3-36. Then, the process of the DSP 35 is terminated. When the MCU 37 receives a notice indicating that the seek operation is terminated, from the DSP 35 in step S3-26 shown in FIG. 14, the MCU 37 terminates the process for the power save at the time of the seek operation.

Figure 17:
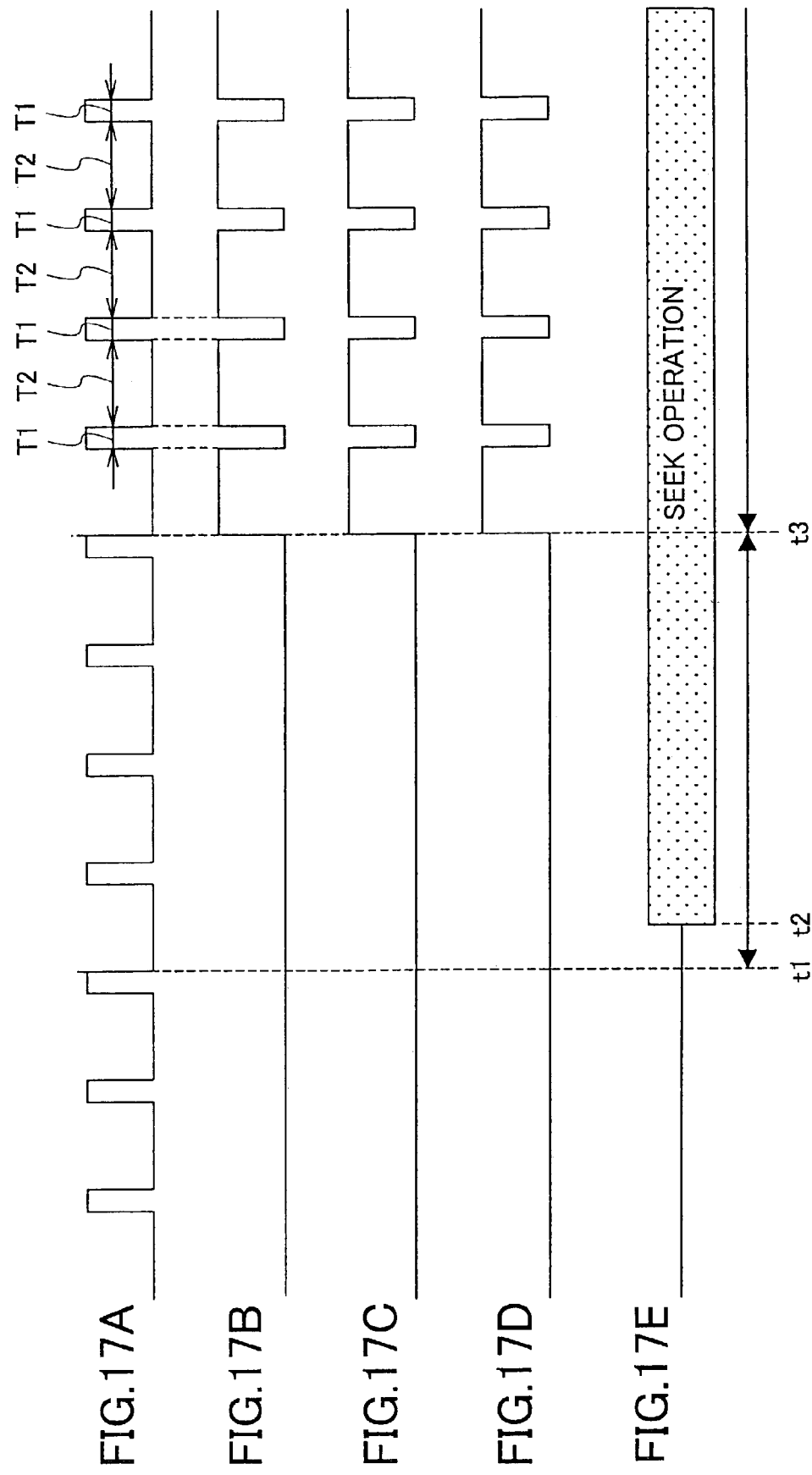
FIG. 17A is a diagram showing the servo gate signal.
FIG. 17B is a diagram showing the power save state of the head IC.
FIG. 17C is a diagram showing the power save state of the SVD.
FIG. 17D is a diagram showing the power save state of the RDC.
FIG. 17E is a diagram showing a seek control operation state of the DSP.
Figure 18:
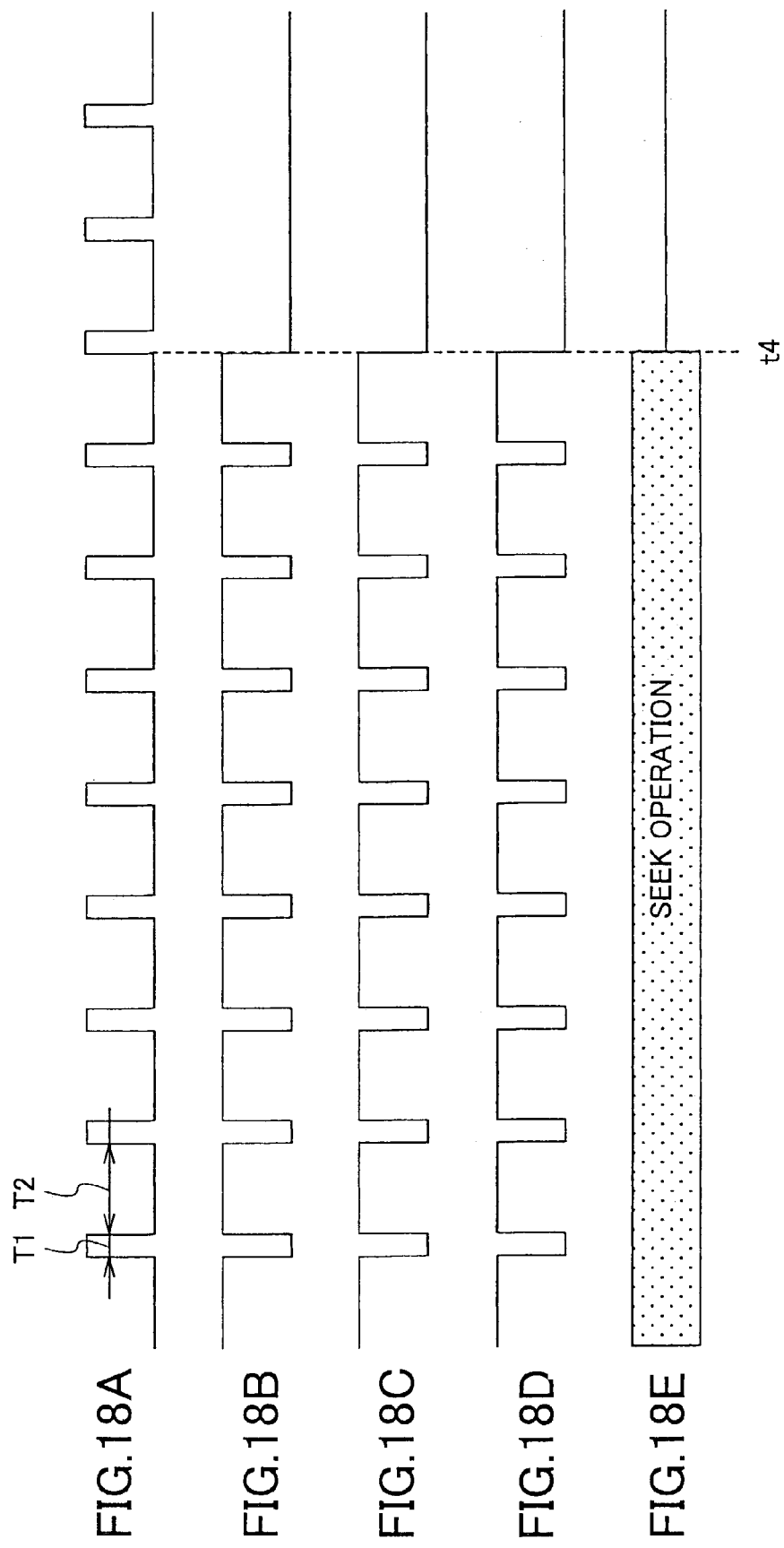
FIG. 18A is a diagram showing the servo gate signal.
FIG. 18B is a diagram showing the power save state of the head IC.
FIG. 18C is a diagram showing the power save state of the SVD.
FIG. 18D is a diagram showing the power save state of the RDC.
FIG. 18E is a diagram showing a seek control operation state of the DSP.

The power save operation at the time of the seek operation will be described with reference to FIG. 17A through FIG. 17E and FIG. 18A through FIG. 18E. FIG. 17A and FIG. 18A are diagrams showing the servo gate signal. FIG. 17B and FIG. 18B are diagrams showing the power save state of the head IC 26. FIG. 17C and FIG. 18C are diagrams showing the power save state of the SVD 34. FIG. 17D and FIG. 18D are diagrams showing the power save state of the RDC 33. FIG. 17E and FIG. 18E are diagrams showing a seek control operation state of the DSP 35. It should be noted that a high level shows timing for regenerating the servo information in FIG. 17A and high levels in FIG. 17B through FIG. 17D show the power save states.

At the time t1, the MCU 37 starts to transfer the parameters for the power save to the particular registers of the RDC 33, the SVD 34, and the Head IC. Also, when the seek command is issued to the DSP 35, the DSP 35 starts the seek operation at a time t2 shown in FIG. 17E.

After the MCU 37 completes the transfer of parameters to the RDC 33, the power save is conducted at a time t3 when the DSP 35 transfers parameters to the particular registers of the RDC 33, the SVD 34, and the Head IC. The power save is released in the RDC 33, the SVD 44, and the Head IC during each time T1 when the servo information becomes reproducible, and then the power save is conducted during each time T2 when data is reproduced in the RDC 33, the SVD 34, and the Head IC as shown in FIG. 17B, FIG. 17C, FIG. 17D, FIG. 18B, FIG. 18C, and FIG. 18D.

Since the DSP 35 writes data to a particular register provided in the head IC 26, the power save of the head IC 26 is conducted. In addition, when the seek operation is completed at a time t4 shown in FIG. 18A through FIG. 18E, the power save of each of the RDC 33, the SVD 34, and the Head IC is released as shown in FIG. 18B, FIG. 18C, and FIG. 18D.

As described above, during the seek operation, unnecessary functions for the seek operation are stopped or the number of operations is reduced. Therefore, it is possible to reduce power consumption.

Next, the power save operation of the magnetic disk apparatus 100 will be described.

Figure 19:
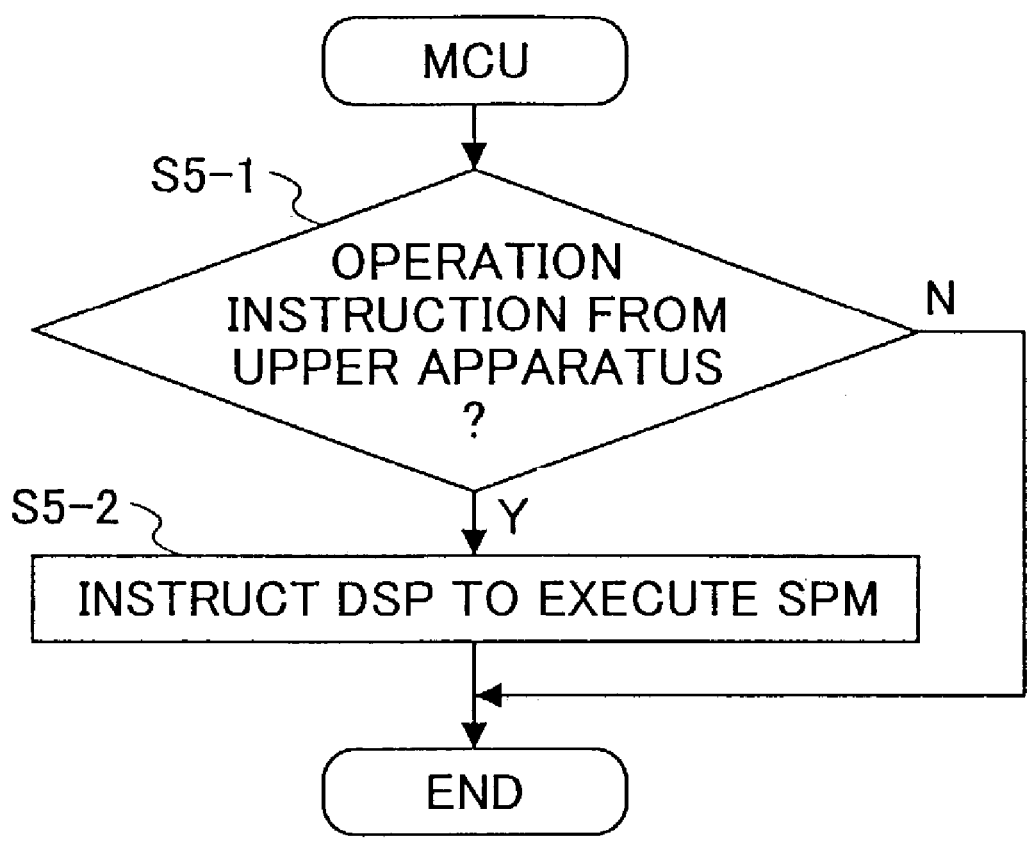
FIG. 19 is a flowchart for explaining the power save process of the MCU when the spindle motor is started.
Figure 20:
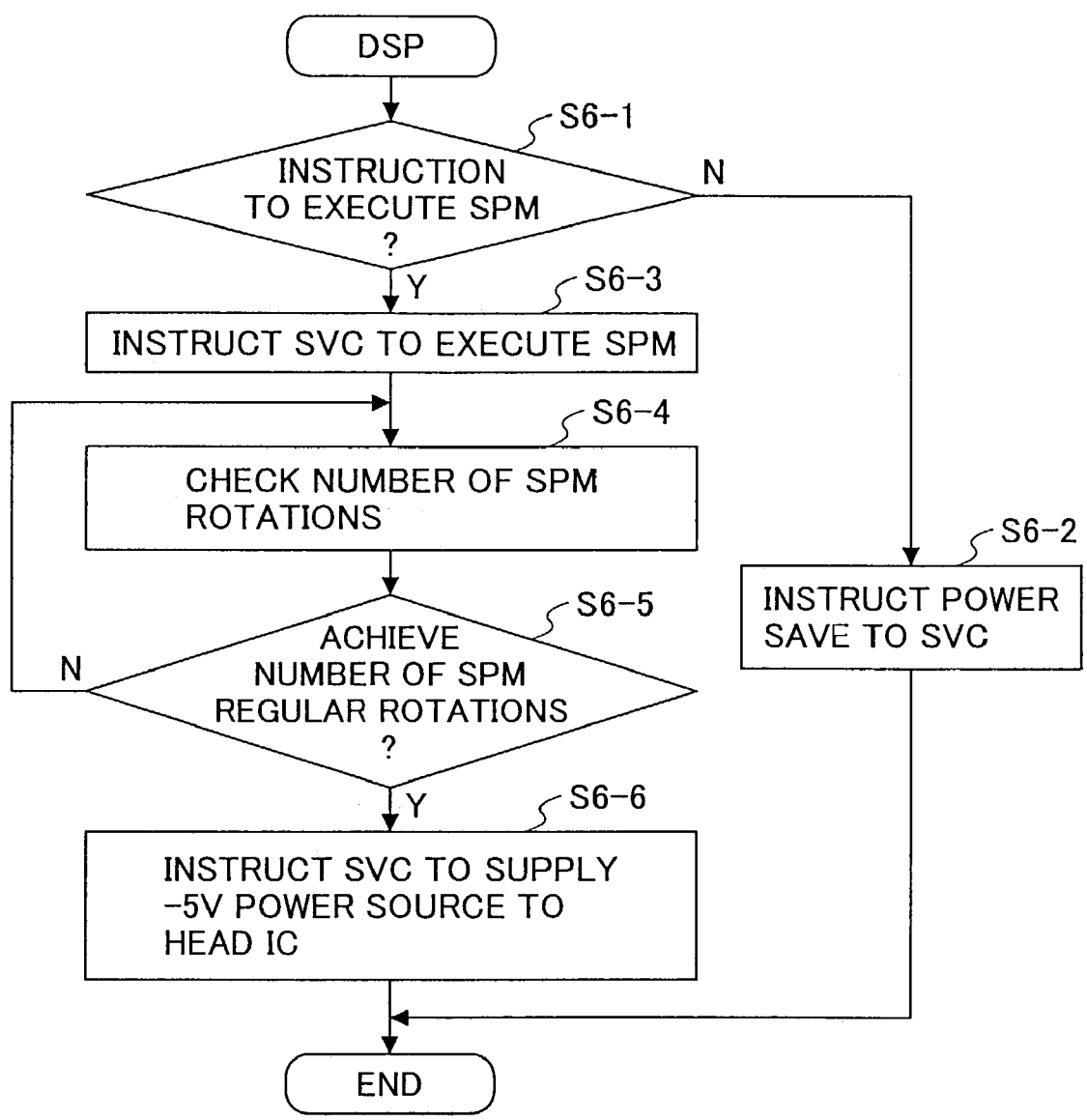
FIG. 20 is a flowchart for explaining the power save process of the DSP when the spindle motor is started.

FIG. 19 is a flowchart for explaining the power save process of the MCU 37 when the spindle motor is activated. FIG. 20 is a flowchart for explaining the power save process of the DSP 35 when the spindle motor is started.

When the MCU 37 receives an operation instruction from the upper apparatus in step S5-1 shown in FIG. 19, the MCU 37 instructs the DSP 35 to start the spindle motor 22 in step S5-2. If there is no instruction to start the spindle motor 22 in step S6-1 as shown in FIG. 20, the DSP 35 does not reproduce the servo information from the magnetic disk 21. Thus, in order to stop operation of the head IC 26, the DSP 35 instructs the SVC 36 to stop supplying −5V power source voltage to the head IC 26 in step S6-2, that is, the DSP 35 instructs the SVC 36 to conduct the power save. When the SVC 36 is instructed by the DSP 35 to stop supplying −5V power source voltage to the head IC 26, the SVC 36 turns OFF the switch 42 of the −5V power source controlling circuit 40. Since the switch 42 of the −5V power source controlling circuit 40 is OFF, the −5V power source voltage is not applied to the head IC 26. The head IC 26 stops operation since the −5V power source voltage is not applied to the head IC 26. Therefore, it is possible to reduce the power consumption caused by a switching loss at the head IC 26 and the −5V power source generating circuit 41.

Moreover, when the DSP 35 is instructed to activate the spindle motor 22 from the MCU 37 in step S6-1, the DSP 35 instructs the SVC 36 to start the spindle motor 22 in step S6-3. When an activating power source is applied from the DSP 35 and the SVC 36 is instructed to start the spindle motor 22, the SVC 36 checks the rotation of the spindle motor 22 in step S6-4. When it is determined in step S6-5 that the rotation of the spindle motor 22 does not achieve a regular rotation speed, the power save state of the SVC 36 is maintained to reduce the power consumption of the head IC 26, since the information recorded to the magnetic disk 21 cannot be properly reproduced.

Furthermore, when the rotation of the spindle motor 22 achieves the regular rotation speed in step S6-5, the DSP 35 releases the instruction of the power save of the SVC 36 in step S6-6. When the SVC 36 is released from the instruction of the power save by the DSP 35, the SVC 36 turns ON the switch 42 of the −5V power source controlling circuit 40. The −5V power source voltage is applied to the head IC 26 by turning ON the switch of the −5V power source controlling circuit 40. The head IC 26 starts the operation by the −5V power source voltage being applied the head IC 26. Since the head IC 26 operates, it is possible to record information to the magnetic disk 21 and reproduce the information from the magnetic disk 21.

As described above, until the rotation of the spindle motor 22 achieves the regular rotation speed when the spindle motor 22 is started, operation of the head IC 26 is stopped. Therefore, it is possible to reduce the power consumption to reduce waste.

In this embodiment, the magnetic disk apparatus 100 is described as an example of the information recording or/and reproducing apparatus. However, the embodiment is not limited to the magnetic disk apparatus 100 but the embodiment can be applied to an optical disk apparatus, a magneto-optical disk apparatus, and a like.

As described above, according to the present invention, for example, it is possible to reduce power consumption in a state of waiting for a command from the upper apparatus while conducting the tracking operation. Consequently, the present invention has a feature that makes it possible to reduce greatly power consumption at a time other than a recording operation and/or a reproducing operation.

Moreover, according to the present invention, since it is possible to reduce power consumption at the time of the seek operation, the present invention has a feature that makes it possible to reduce greatly the power consumption at a time of other than a recording operation and/or a reproducing operation.

The present invention is not limited to the specifically disclosed embodiments, variations and modifications, and other variations and modifications may be made without departing from the scope of the present invention.

The present application is based on Japanese Priority Application No. 2002-008577 filed on Jan. 17, 2002, the entire contents of which are hereby incorporated by reference.

What is claimed is:

1. An apparatus for recording and/or reproducing information comprising means for reproducing servo information being recorded on a medium and means for conducting a tracking operation based on the servo information, said apparatus further comprising:
   at least two processors operating independently from each other by firmware; and
   a power save part conducting a power save by reducing more than one operation clock frequency in accordance with a predetermined process with respect to the at least two processors during a tracking operation, and increasing the reduced operation clock frequency during writing and reading operations.

2. The apparatus as claimed in claim 1, wherein said power save part conducts the power save by reducing a number of tracking controls.

3. The apparatus as claimed in claim 1, wherein said power save part conducts the power save when a command has not been supplied from an upper apparatus for a predetermined time.

4. The apparatus as claimed in claim 1,
wherein the at least two processors include a main processor and one or more sub processors, and
wherein the power save part controls the at least two processors so that after at least one operation clock frequency of the one or more sub processors is reduced, an operation clock frequency of the main processor is reduced.

5. The apparatus as claimed in claim 4, wherein the power save part controls the at least two processors so that after the operation clock frequency of the main processor is reset, the at least one operation clock frequency of the one or more sub processors is reset.

6. An apparatus for recording and/or reproducing information comprising means for reproducing servo information being recorded on a medium and means for conducting a seek operation based on the servo information, said apparatus further comprising a power save part conducting a power save operation during the seek operation including stopping a power supply to a circuit for recording the information to said medium and exchanging the information with said medium.

7. A method for operating an information recording and/or reproducing apparatus, including at least two processors operating independently from each other by firmware, that reproduces servo information being recorded on a medium and conducts a tracking operation based on the servo information, said method further comprising the step of conducting a power save by reducing more than one operation clock frequency during the tracking in accordance with a predetermined process with respect to the at least two processors' operation.

8. The method as claimed in claim 7, wherein said step conducts the power save by reducing a number of tracking controls.

9. The method as claimed in claim 8, wherein said step conducts the power save when a command has not been supplied from an upper apparatus for a predetermined time during the tracking operation.

10. The method as claimed in claim 7, wherein said step conducts the power save when a command has not been supplied from an upper apparatus for a predetermined time during the tracking operation.

11. The apparatus as claimed in claim 7,
wherein the at least two processors include a main processor and one or more sub processors, and
wherein the power save is conducted to control the at least two processors so that after at least one operation clock frequency of the one or more sub processors is reduced, an operation clock frequency of the main processor is reduced.

12. The apparatus as claimed in claim 11, wherein the power save part is conducted to control the at least two processors so that after the operation clock frequency of the main processor is reset, the at least one operation clock frequency of the one or more sub processors is reset.

13. A method for operating an information recording and/or reproducing apparatus that reproduces servo information being recorded on a medium and conducts a seek operation based on the servo information, said method further comprising the step of conducting a power save for more than one circuit during the seek operation including stopping a power supply to a circuit for recording information to said medium and/or exchanging information with said medium.

* * * * *